US009779583B2

(12) United States Patent
Elias et al.

(10) Patent No.: US 9,779,583 B2
(45) Date of Patent: *Oct. 3, 2017

(54) SYSTEMS AND METHODS FOR PROMOTING GAME PLAY FREQUENCY

(71) Applicant: Gamesys Ltd., London (GB)

(72) Inventors: Hans Elias, St. Albans (GB); Alexander Sandford Todd Young, Balham (GB); Thomas David James Aicken, London (GB); Robeson Mandela Reeves, London (GB)

(73) Assignee: Gamesys Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,209

(22) Filed: Nov. 29, 2016

(65) Prior Publication Data

US 2017/0084121 A1    Mar. 23, 2017

Related U.S. Application Data

(63) Continuation of application No. 14/215,277, filed on Mar. 17, 2014, now Pat. No. 9,511,279.

(Continued)

(51) Int. Cl.
*A63F 13/00* (2014.01)
*G07F 17/32* (2006.01)
*A63F 13/44* (2014.01)

(52) U.S. Cl.
CPC .......... *G07F 17/3255* (2013.01); *A63F 13/00* (2013.01); *G07F 17/3211* (2013.01);

(Continued)

(58) Field of Classification Search
CPC ............. G07F 17/3267; G07F 17/3255; G07F 17/3244; A63F 13/44

(Continued)

(56) References Cited

U.S. PATENT DOCUMENTS

| 4,743,029 A | * | 5/1988 | Consolatore ........ A63F 3/00261 273/243 |
| 5,660,389 A | * | 8/1997 | Freda, III .............. A63F 3/0449 273/249 |

(Continued)

FOREIGN PATENT DOCUMENTS

| WO | WO0022585 | 4/2000 |
| WO | WO2010151904 | 12/2010 |

OTHER PUBLICATIONS

International Search Report for Application No. PCT/US2014/030111 dated Aug. 28, 2014; 3 pps.

(Continued)

*Primary Examiner* — Michael Cuff
(74) *Attorney, Agent, or Firm* — Michael D. Downs; Fincham Downs LLC

(57) ABSTRACT

The present invention provides methods, systems and apparatus for promoting game play frequency of online games. Embodiments include displaying a plurality of positioned game elements, wherein each positioned game element is associated with a game time period; displaying a game indicia associated with a positioned game element if a player has acquired a game piece during the game time period associated with the positioned game element; selecting one or more positioned game elements after a game duration; and awarding one or more prizes if the selected positioned game elements are associated with a game indicia. Numerous additional aspects are disclosed.

21 Claims, 7 Drawing Sheets

Related U.S. Application Data

(60) Provisional application No. 61/786,312, filed on Mar. 15, 2013.

(52) U.S. Cl.
CPC ...... G07F 17/3225 (2013.01); G07F 17/3244 (2013.01); *A63F 13/44* (2014.09)

(58) Field of Classification Search
USPC .............................................. 463/42, 40, 25
See application file for complete search history.

(56) References Cited

U.S. PATENT DOCUMENTS

| | | | |
|---|---|---|---|
| 6,003,013 | A | 12/1999 | Boushy |
| 6,193,608 | B1 | 2/2001 | Walker |
| 6,582,310 | B1 | 6/2003 | Walker |
| 6,769,691 | B1 * | 8/2004 | Kim ................... A63F 3/00072 273/256 |
| 6,993,494 | B1 | 1/2006 | Boushy |
| 7,780,525 | B2 | 8/2010 | Walker |
| 8,087,998 | B2 | 1/2012 | Silvestro |
| 8,177,630 | B2 | 5/2012 | Bryant |
| 8,177,634 | B2 | 5/2012 | Herrmann |
| 8,187,087 | B2 | 5/2012 | Herrmann |
| 8,187,101 | B2 | 5/2012 | Herrmann |
| 8,192,277 | B2 | 6/2012 | Soltys |
| 8,246,466 | B2 | 8/2012 | Herrmann |
| 8,360,870 | B2 | 1/2013 | Herrmann |
| 8,366,550 | B2 | 2/2013 | Herrmann |
| 8,425,313 | B2 | 4/2013 | Nelson |
| 8,430,749 | B2 | 4/2013 | Nelson |
| 8,512,150 | B2 | 8/2013 | Herrmann |
| 8,784,191 | B1 * | 7/2014 | Basallo ............... G07F 17/3267 463/16 |
| 9,418,515 | B2 * | 8/2016 | Thacker .............. G07F 17/3244 |
| 2003/0078101 | A1 | 4/2003 | Schneider |
| 2003/0090058 | A1 * | 5/2003 | Spende ................ A63F 3/0605 273/148 R |
| 2004/0039679 | A1 | 2/2004 | Norton |
| 2004/0143496 | A1 | 7/2004 | Saenz |
| 2005/0054439 | A1 | 3/2005 | Rowe |
| 2006/0068876 | A1 * | 3/2006 | Kane ....................... G07F 17/32 463/16 |
| 2006/0240891 | A1 | 10/2006 | Klinkhammer |
| 2006/0267276 | A1 * | 11/2006 | Farmer .................... A63F 9/10 273/157 R |
| 2006/0277103 | A1 | 12/2006 | Fujita |
| 2006/0281518 | A1 * | 12/2006 | Sims ...................... A63F 3/081 463/17 |
| 2007/0037622 | A1 | 2/2007 | Chan |
| 2007/0045958 | A1 | 3/2007 | Rader |
| 2007/0057470 | A1 * | 3/2007 | Mohr ...................... A63F 9/18 273/432 |
| 2008/0146346 | A1 * | 6/2008 | Hardy .................... G07F 17/32 463/42 |
| 2008/0287187 | A1 | 11/2008 | Seelig |
| 2009/0088245 | A1 | 4/2009 | Klinkhammer |
| 2009/0121431 | A1 | 5/2009 | Rader |
| 2009/0176578 | A1 | 7/2009 | Herrmann |
| 2009/0275399 | A1 | 11/2009 | Kelly |
| 2010/0120505 | A1 * | 5/2010 | Caputo ............... G07F 17/3262 463/20 |
| 2010/0211449 | A1 | 8/2010 | Nelson |
| 2010/0227674 | A1 | 9/2010 | Neo |
| 2011/0081958 | A1 | 4/2011 | Herrmann |
| 2011/0282728 | A1 | 11/2011 | Bingham |
| 2011/0319158 | A1 * | 12/2011 | Champagne ........ G07F 17/3239 463/25 |
| 2012/0071245 | A1 | 3/2012 | Kotkin |
| 2012/0190419 | A1 | 7/2012 | Yoseloff |
| 2012/0190423 | A1 | 7/2012 | Yoseloff |
| 2012/0215327 | A1 | 8/2012 | Wright |
| 2012/0238353 | A1 | 9/2012 | Herrmann |
| 2013/0090750 | A1 | 4/2013 | Herrman |
| 2013/0102383 | A1 | 4/2013 | Smith |

OTHER PUBLICATIONS

Written Opinion for Application No. PCT/US2014/030111 dated Aug. 28, 2014; 4 pps.
International Preliminary Report on Patentability for Application No. PCT/US2014/030111 dated Sep. 15, 2015; 5 pps.
Notice of Allowance for U.S. Appl. No. 14/215,277 dated Sep. 13, 2016; 9 pps.

\* cited by examiner

SYSTEMS AND METHODS FOR PROMOTING GAME PLAY FREQUENCY

PRIORITY CLAIM

The present application claims the benefit of priority of U.S. Provisional Patent Application Ser. No. 61/786,312, filed Mar. 15, 2013 in the name of Hans Elias et al. and is entitled "SYSTEMS AND METHODS FOR PROMOTING GAME PLAY FREQUENCY." The entirety of this provisional application is incorporated by reference herein for all purposes.

FIELD

Embodiments of the present invention are related to online games, and more particularly to systems and methods for promoting game play frequency of online and other games.

BACKGROUND

Revenue from online gaming systems can be based upon the number of players and the amount and/or frequency of play. Thus, online gaming systems benefit from players being active on the systems and returning to play as frequently as possible. While incentive systems are known for encouraging playing for longer periods, what is needed are systems and methods for promoting game play frequency of online games.

SUMMARY

In some aspects, embodiments of the present invention provide a method of promoting game play frequency of online and other games. The method includes displaying a plurality of positioned game elements, wherein each positioned game element is associated with a game time period; displaying a game indicia associated with a positioned game element if a player has acquired a game piece during the game time period associated with the positioned game element; selecting one or more positioned game elements after a game duration; and awarding one or more prizes if the selected positioned game elements are associated with a game indicia.

In some other aspects, embodiments of the present invention provide a system for promoting game play frequency of online and other games. The system includes a processor; and a memory storing instructions, the instructions adapted to execute on the processor to: display a plurality of positioned game elements, wherein each positioned game element is associated with a game time period; display a game indicia associated with a positioned game element if a game piece is acquired during the game time period associated with the positioned game element; select one or more positioned game elements after a game duration; and award one or more prizes if the selected positioned game elements are associated with a game indicia.

In yet other aspects, embodiments of the present invention provide an alternative method for promoting game play frequency of online and other games. The alternative method includes displaying a plurality of positioned game elements, wherein each positioned game element is associated with a game time period; providing a free-to-play game wherein a player can acquire a game piece during each game time period; displaying a game indicia associated with a positioned game element if the player has acquired a game piece during the game time period associated with the positioned game element; selecting one or more positioned game elements after a game duration; and awarding one or more prizes if the selected positioned game elements are associated with a game indicia, wherein the prizes are associated with a pay-to-play game.

Numerous other aspects are provided in accordance with these and other embodiments of the invention. Other features and aspects of embodiments of the present invention will become more fully apparent from the following detailed description, the appended claims, and the accompanying drawings.

DETAILED DESCRIPTION OF EXAMPLE EMBODIMENTS

Figure 1:
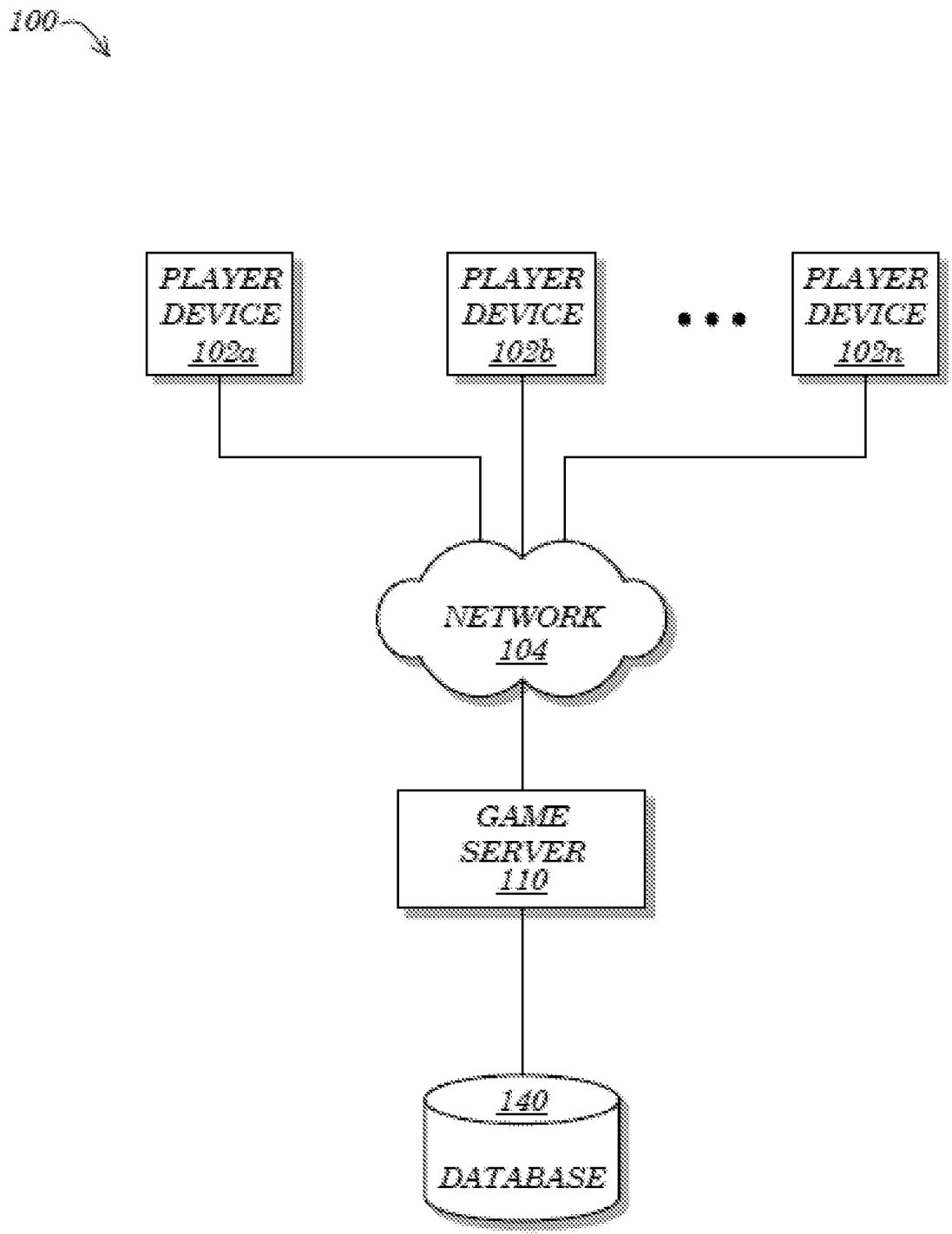
FIG. 1 is a schematic diagram of an embodiment of a distributed computing system in accordance with one or more embodiments described herein.

Embodiments presented herein are descriptive of systems, apparatus, methods, and articles of manufacture for promoting game play frequency of online or other games. According to some embodiments of the present invention, an online gaming website provides a "free-to-play" game that can award prizes that can be related to the website's main "pay-to-play" games. In a daily free-to-play game example, players are encouraged to come to the gaming website each day to play a game in which the players collect symbols in exchange for accessing the gaming website or performing some other task. For example, the more days a player accesses the website, the more symbols or game indicia the player collects. The more symbols a player collects, the higher the chance the player will win a prize at the end of the game time period. Different symbols can be collected on different days and, in some embodiments, different symbols result in different prizes. In some embodiments, the prizes are free plays of the website's main pay-to-play games. Thus, embodiments of the present invention can provide an incentive to a player to access the gaming website daily to see if the player will win free play of the website's games or other prizes. Other access or play frequencies (e.g., number of free play opportunities per game time period) can be used, for example, hourly, two times daily, four times daily, ten times weekly, fifty times monthly, etc. In some embodiments, merely accessing the gaming website can earn the player a symbol and in other embodiments, the player may be asked, for example, to spin a virtual reel of a graphical user interface (GUI) control to see if or what symbol the player earns.

According to some embodiments, the free-to-play game provides a game grid or other arrangement of positioned game elements and the player selects one or more game elements to reveal a hidden symbol at the selected position. In some embodiments, the grid or other arrangement is maintained throughout a set game time period (e.g., a week, two weeks, a month, two months, six months, a year, etc.) and may be reset at the end of the game time period (e.g., after the final day of a week). Thus, according to some embodiments, free-to-play games can include a game time period that defines the amount of time available to play the games and a play frequency which defines how often the game can be played during the game time period. In some embodiments, a third parameter can be defined, called the game duration, which specifies a number of game time periods for a game. Thus, for example, a free-to-play game can have a game time period of one day with a game play frequency of once per game time period (i.e., daily) and a game duration of a month. In some other embodiments for example, the game play frequency can be three times per game time period, the game time period can be twelve hours, and the game duration can be a week. In such an example, players would have thirty-five opportunities for free play during the week long game duration.

Thus, a daily free-to-play game such as the type described above can be modified to include other time-based elements in the game such as game duration. For example, as mentioned above, a monthly duration can be added to a daily game. A monthly duration can encourage players to come back daily on as many days as possible because each day the players return to play, the players can earn a game indicia to cover or mark a corresponding position on a secondary game grid. In some embodiments, a primary free-to-play game may award instant prizes and a secondary free-to-play game may award game indicia for the secondary game for which an outcome is determined at the end of the game duration. For example, each position on the secondary game grid can be representative of a day of the month (or the defined duration of the secondary game). At the end of the month, the secondary game is played out, for example, as players are presented with a visual display of one or more positions on the secondary game grid being randomly or otherwise selected.

According to some embodiments, if a player has a game indicia covering a system-selected grid position (e.g., the player played the daily game on the day corresponding to the selected grid position), the player can be awarded a prize or other reward. For example, the reward may include a chance at winning one or more monthly prizes, cash, a "free spin" in the pay-to-play game, or the like. In some embodiments, the player is alternatively or additionally given the option to reveal a potential prize hidden behind the game indicia on the selected grid position to determine if the player has won a prize.

In some embodiments, if the player's grid did not have a game indicia at the system selected grid position (e.g., because the player did not play on the day the selected grid positions represents), in some embodiments the player does not get an opportunity to win (e.g., the player has a zero percent chance of winning) and is therefore not given the option to reveal a potential prize hidden at that position. In some embodiments, multiple grid positions can be selected by the system and/or multiple prizes can be awarded for each grid position covered by a player's game indicia.

According to some embodiments, players may be rewarded with multipliers and/or extra wins (e.g., for use in a daily game and/or monthly game) for playing a first game (e.g., a daily game) on one or more special days (e.g., as defined by the system). For example, players may win special day multipliers and/or extra wins for playing a daily game on specifically defined special days (e.g., on a particular day of the week, or during a particular month).

According to some embodiments, players may be rewarded with multipliers, extra wins and/or other types of benefits for playing a first game (e.g., a daily game) at least a predetermined minimum number times in a row (e.g., as defined by the system). In one example, if a player plays a daily game on at least a minimum number of consecutive days (e.g., the player plays on each of seven (7) days in a row), the player may be awarded with a multiplier applicable to any prizes won in a second game based on those consecutive plays of the daily game.

In alternative embodiments, a player is allowed to cover a number of grid positions at the beginning of a game duration. The number of grid positions a player is allowed to cover can be determined randomly as part of an initial part of the free-to-play game, the number can be a predefined fixed number, or, in some embodiments, the number can be based upon a frequency of play by the player during a prior game duration. In any event, the player covered grid positions are subjected to being eliminated or discarded by the system during the duration of the game. In some embodiments, the player can improve the chances of his covered grid positions not being eliminated by accessing the game during the duration to earn protection for the covered positions. In some embodiments, the players who return daily can earn a movement ability that allows the player to move the covered positions toward other positions (e.g., "safe" positions). The player covered grid positions that survive throughout the duration (e.g., are not eliminated by the system) can provide the player with an opportunity to win a prize or actually provide the player with a prize.

DEFINITIONS

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein (unless specified otherwise), may generally comprise any game (e.g., wagering or non-wagering, electronically playable over a network) playable by one or more players in accordance with specified rules. A game may be playable on a Personal Computer (PC) online in web browsers, on a game console and/or on a mobile device such as a smart-phone or tablet computer. "Gaming" thus generally refers to play of a game.

A "round of a game", "a game play", or a "game instance of a game", as the terms are used herein (unless specified otherwise), are intended to be synonymous and may general refer to an event or set of events upon the conclusion of which a result is determined. A round of a game may include several turns of a player. A hand of poker is an example of a round of a game. Note that a round of a game may be distinguished from a round of betting in that there may be several rounds of betting in a single round of a game.

A "casual game", as the term is used herein (unless specified otherwise), may generally comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game. In some embodiments, a casual game can be a social network game.

A "social network game", as used herein (unless specified otherwise), generally refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein (unless specified otherwise), may generally comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" generally refers to play of a wagering game.

A "pay-to-play game", as the term is used herein (unless specified otherwise), may generally include any game, including wagering games, in which a fee is charged to play the game. The fee may be in the form of an access fee, a wager, a buy-in, or any other practicable form. The fee may be collected before, after, or during game play. The fee may be monetary or paid in any other form of value.

A "free-to-play game", as the term is used herein (unless specified otherwise), may generally include any game, including wagering games, in which a fee is not charged to play the game. The game may award prizes that include cash payouts or other forms of monetary or other value.

The term "game provider", as used herein (unless specified otherwise), generally refers to an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

As utilized herein, the term "player" may generally refer to any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used herein, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used herein (unless specified otherwise), may generally refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

A "session", as the term is used herein (unless indicated otherwise), may generally comprise a period of time spanning a plurality of event instances or turns of the game, the session having a defined start and defined end. An event instance or turn is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance).

As used herein, the terms "outcome" and "result" should be differentiated in the present description in that an "outcome" is generally a representation of a "result", typically comprising one or more game elements or game symbols. For example, in a "fruit themed" game, a winning outcome (i.e., an outcome corresponding to some kind of award, prize or payout) may comprise a combination of three "cherry" symbols. The "result" of this outcome may be a payout of X credits awarded to the player associated with the game. In another example, in a game in which a character moves along a game interface from a starting position to a finish position, an "outcome" of the game may comprise a symbol representing one or more movements along the interface and the "result" corresponding to this outcome may be the particular number and direction of the character's movement (e.g., three (3) spaces backwards such that the character ends up further away from the finish line). In a session embodiment, a session result may comprise a binary result (e.g., a player or game character wins or loses the session) and/or the particular award (or magnitude of award) won or earned by the player based on the session (e.g., the number of credits awarded to the player). It should be noted that the embodiments described herein encompass awards, prizes and payouts which are monetary, non-monetary, tangible or intangible.

As used herein, the term "virtual currency" may generally refer to an in-game currency that may be used as part of a game or one or more games provided by a game provider as (i) currency for making wagers, and/or (ii) to purchase or access various in-game items, features or powers.

A "credit balance", as the term is used herein (unless indicated otherwise), may generally refer to (i) a balance of currency, whether virtual currency and/or real currency, usable for making wagers in a game and/or (ii) another tracking mechanism for tracking a player's success or advancement in a game by deducting there from points or value for unsuccessful attempts at advancement and adding thereto points or value for successful attempts at advancement.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable here.

In some embodiments, one or more specialized machines such as a computerized processing device, a server, a remote terminal, and/or a customer device may implement the various practices described herein. A computer system of an gaming entity may, for example, comprise various specialized computers that interact to provide for online games as described herein.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

Systems

Turning first to FIG. 1, a block diagram of an example system 100 according to some embodiments is shown. The example system 100 is adapted to implement the methods of the present invention. In some embodiments, the system 100 may comprise a gaming platform such as a gaming platform via which one or more multiplayer and/or online games may be played. In some embodiments, the system 100 may comprise a plurality of player devices 102*a-n* in communication with and/or via a network 104. In some embodiments, a game server 110 may be in communication with the network 104 and/or one or more of the player devices 102a-n. In some embodiments, the game server 110 (and/or the player devices 102a-n) may be in communication with a database 140. The database 140 may store, for example, game date (e.g., processed and/or defined by the game server 110), data associated with players (not explicitly shown) owning and/or operating the player devices 102a-n, and/or instructions that cause various devices (e.g., the game server 110 and/or the player devices 102a-n) to operate in accordance with embodiments described herein.

According to some embodiments, any or all of the components 102a-n, 104, 110, 140 of the system 100 may be similar in configuration and/or functionality to any similarly named and/or numbered components described herein. Fewer or more components 102a-n, 104, 110, 140 (and/or portions thereof) and/or various configurations of the components 102a-n, 104, 110, 140 may be included in the system 100 without deviating from the scope of embodiments described herein. While multiple instances of some components 102a-n are depicted and while single instances of other components 104, 110, 140 are depicted, for example, any component 102a-n, 104, 110, 140 depicted in the system 100 may comprise a single device, a combination of devices and/or components 102a-n, 104, 110, 140, and/or a plurality of devices, as is or becomes desirable and/or practicable. Similarly, in some embodiments, one or more of the various components 102a-n, 104, 110, 140 may not be needed and/or desired in the system 100.

The player devices 102a-n, in some embodiments, may comprise any type or configuration of electronic, mobile electronic, and or other network and/or communication devices (or combinations thereof) that are or become known or practicable. A first player device 102a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102a-n may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102a-n, the game server 110, and/or the database 140. In some embodiments, the network 104 may comprise direct communications links between any or all of the components 102a-n, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102b may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games. In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may provide benefits to players based on player referrals and/or based on groups of players that play together in an online multiplayer game.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102a-n may comprise the database 140 or a portion thereof, for example, and/or the game server 110 may comprise the database 140 or a portion thereof.

Figure 2:
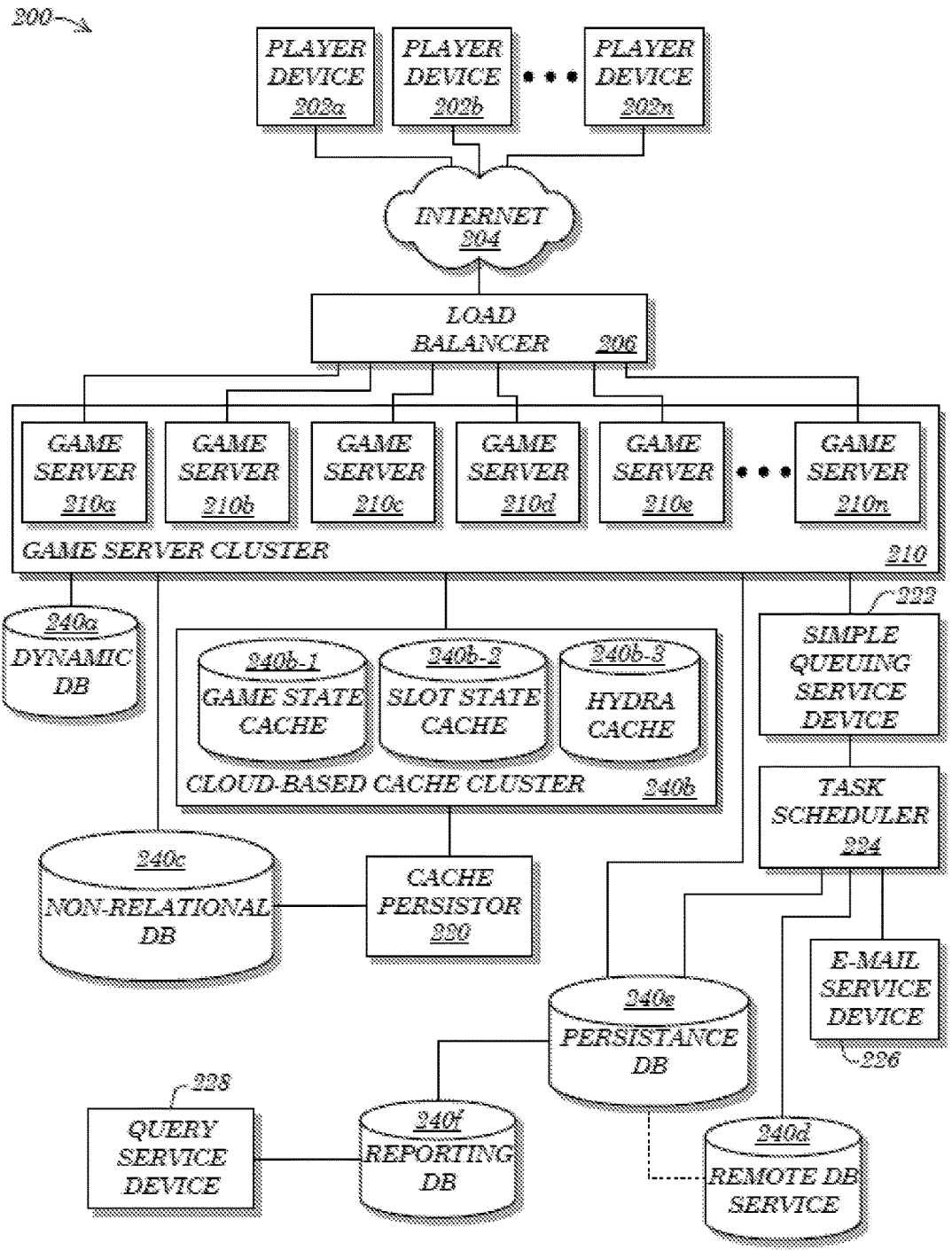
FIG. 2 is a schematic diagram of an embodiment of a distributed computing platform in accordance with one or more embodiments described herein.

Referring now to FIG. 2, a block diagram of a system 200 according to some embodiments is shown. In some embodiments, the system 200 may comprise a gaming platform such as a platform via which social, multiplayer, and/or online games may be played. In some embodiments, the system 200 may comprise a plurality of player devices 202a-n, the Internet 204, a load balancer 206, and/or a game server cluster 210. The game server cluster 210 may, in some embodiments, comprise a plurality of game servers 210a-n. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202a-n, 204, 206, 210a-n, 220, 222, 224, 226, 228 may be in communication with and/or coupled to one or more databases 240a-f The system 200 may comprise, for example, a dynamic DataBase (DB) 240a, a cloud-based cache cluster 240b (e.g., comprising a game state cache 240b-1, a slot state cache 240b-2, and/or a "hydra" cache 240b-3), a non-relational DB 240c, a remote DB service 240d, a persistence DB 240e, and/or a reporting DB 240f.

According to some embodiments, any or all of the components 202a-n, 204, 206, 210a-n, 220, 222, 224, 226, 228, 240a-f of the system 200 may be similar in configuration and/or functionality to any similarly named and/or numbered components described herein. Fewer or more components 202a-n, 204, 206, 210a-n, 220, 222, 224, 226, 228, 240a-f (and/or portions thereof) and/or various configurations of the components 202a-n, 204, 206, 210a-n, 220, 222, 224, 226, 228, 240a-f may be included in the system 200 without deviating from the scope of embodiments described herein. While multiple instances of some components 202a-n, 210a-n, 240a-f are depicted and while single instances of other components 204, 206, 220, 222, 224, 226, 228 are depicted, for example, any component 202a-n, 204, 206, 210a-n, 220, 222, 224, 226, 228, 240a-f depicted in the system 200 may comprise a single device, a combination of devices and/or components 202a-n, 204, 206, 210a-n, 220, 222, 224, 226, 228, 240a-f, and/or a plurality of devices, as is or becomes desirable and/or practicable. Similarly, in some embodiments, one or more of the various components 202a-n, 204, 206, 210a-n, 220, 222, 224, 226, 228, 240a-f may not be needed and/or desired in the system 200.

According to some embodiments, the player devices 202a-n may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210a-n (virtual and/or physical) of the game server cluster 210 may be configured to provide, manage, host, and/or conduct individual instances and/or sessions of available game types. A first game server 210a, for example, may host a first particular session of an online bingo game (or tournament), a second game server 210c may host a second particular session of an online bingo game (or tournament), a third game server 210c may facilitate an online poker tournament (e.g., and a corresponding plurality of game sessions that comprise the tournament), and/or a fourth game server 210d may provide an online slots game (e.g., by hosting one or more slot game sessions).

In some embodiments, the player devices 202a-n may comprise various components (hardware, firmware, and/or software; not explicitly shown) that facilitate game play and/or interaction with the game server cluster 210. The player device 202a-n may, for example, comprise a gaming client such as a software application programmed in Adobe® Flash® and/or HTML 5 that is configured to send requests to, and receive responses from, one or more of the game servers 210a-n of the game server cluster 210. In some embodiments, such an application operating on and/or via the player devices 202a-n may be configured in Model-View-Controller (MVC) architecture with a communication manager layer responsible for managing the requests to/responses from the game server cluster 210. In some embodiments, one or more of the game servers 210a-n may also or alternatively be configured in a MVC architecture with a communication manager and/or communications management layer (not explicitly shown in FIG. 2). In some embodiments, communications between the player devices 202a-n and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202a-n and the game server cluster 210 may be managed and/or facilitated by the load balancer 206. The load balancer 206 may, for example, route communications from player devices 202a-n to one or more of the specific game servers 210a-n depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210a-n within the game server cluster 210. In the case that traffic and/or requests from the player devices 202a-n only require the first and second game servers 210a-b, for example, all other game servers 210c-n may be taken off-line, may not be initiated and/or called, and/or may otherwise not be required and/or utilized in the system 200. As demand increases (and/or if performance, security, and/or other issues cause one or more of the first and second game servers 210a-b to experience detrimental issues), the load balancer 206 may call and/or bring online one or more of the other game servers 210c-n depicted in FIG. 2. In the case that each game server 210a-n comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202a-n and the game server cluster 210 are conducted and/or routed. Such proxy servers and/or devices may comprise one or more regional game hosting centers, for example, which may be geographically dispersed and addressable by player devices 202a-n in a given geographic proximity. In some embodiments, the proxy servers and/or devices may be located in one or more geographic areas and/or jurisdictions while the game server cluster 210 (and/or certain game servers 210a-n and/or groups of game servers 210a-n thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202a-n such as by utilizing a broadcaster device (also not separately shown in FIG. 2) that transmits the time-released game results to the player devices 202a-n (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advanced Research Projects Agency (DARPA), published by the Information Sciences Institute, University of Southern California, J. Postel, ed. (September 1981)).

In some embodiments, the game server cluster 210 (and/or one or more of the game servers 210a-n thereof) may be in communication with the dynamic DB 240a. According to some embodiments, the dynamic DB 240a may comprise a dynamically-scalable database service such as the DyanmoDB™ service provided by Amazon® Web Services, LLC. The dynamic DB 240a may, for example, store information specific to one or more certain game types (e.g., slots) provided by the game server cluster 210 such as to allow, permit, and/or facilitate reporting and/or analysis of such information.

According to some embodiments, the game server cluster 210 (and/or one or more of the game servers 210a-n thereof) may be in communication with the cloud-based cache cluster 240b. Game state information from the game server cluster 210 may be stored in the game state cache 240b-1, for example, slot state (e.g., slot-game specific state) data may be stored in the slot state cache 240b-2, and/or other game and/or player information (e.g., progressive data, referral data, player rankings, audit data) may be stored in the hydra cache 240b-3. In some embodiments, the cache persistor 220 may move and/or copy data stored in the cloud-based cache cluster 240b to the non-relational DB 240c. The non-relational DB 240c may, for example, comprise a SimpleDB™ service provided by Amazon® Web Services, LLC. According to some embodiments, the game server cluster 210 may generally access the cloud-based cache cluster 240b as-needed to store and/or retrieve game-related information. The data stored in the cloud-based cache cluster 240b may generally comprise a subset of the newest or freshest data, while the cache persistor 220 may archive and/or store or move such data to the non-relational DB 240c as it ages and/or becomes less relevant (e.g., once a player logs-off, once a game session and/or tournament ends). The game server cluster 210 may, in accordance with some embodiments, have access to the non-relational DB 240c as-needed and/or desired. The game servers 210a-n may, for example, be initialized with data from the non-relational DB 240c and/or may store and/or retrieve low frequency and/or low priority data via the non-relational DB 240c.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240d (e.g., providing inserts and/or updates), and/or the persistence DB 240e (e.g., providing and/or updating game, player, and/or other reporting data), e.g., in accordance with one or more schedules.

According to some embodiments, the persistence DB 240e may comprise a data store of live environment game and/or player data. The game server cluster 210 and/or the task scheduler 224 or SQS device 222 may, for example, store game and/or player data to the persistence DB 240e and/or may pull and/or retrieve data from the persistence DB 240e, as-needed and/or desired. The server cluster 210 may, according to some embodiments, provide and/or retrieve spin and/or other game event info and/or configuration information via the persistence DB 240e.

In some embodiments, the reporting DB 240f may be created and/or populated based on the persistence DB 240e. On a scheduled and/or other basis, for example, a data transformation and/or mapping program may be utilized to pull data from the live environment (e.g., the persistence DB 240e) into the reporting DB 240f The query service 228 may then be utilized, for example, to query the reporting DB 240f, without taxing the live environment and/or production system directly accessible by the game server cluster 210.

Figure 3:
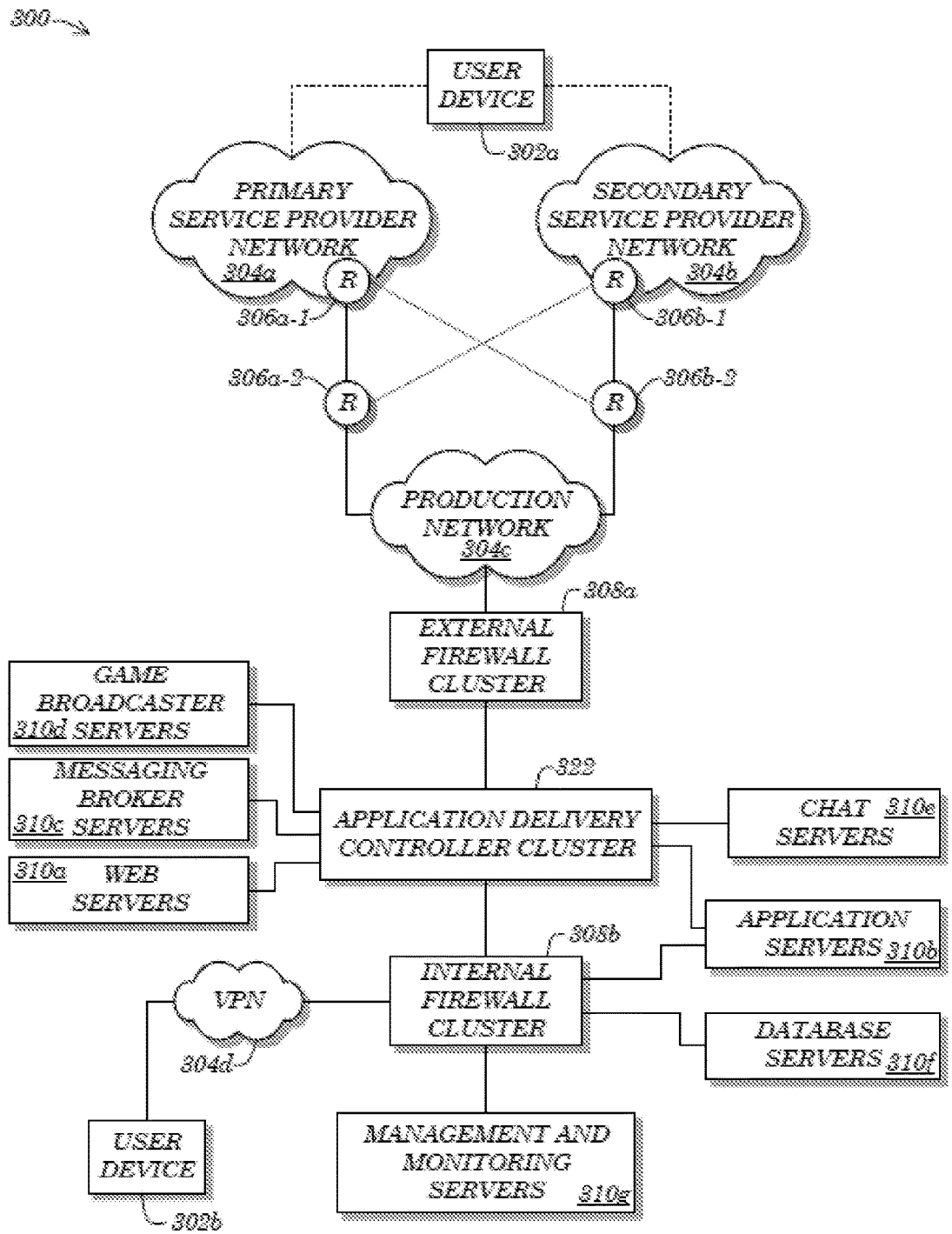
FIG. 3 is a block diagram of an embodiment of a computing device useful in a system according to one or more embodiments described herein.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played. In some embodiments, the system 300 may comprise a plurality of user devices 302a-b, a plurality of networks 304a-b (e.g., a primary service provider network 304a, a secondary service provider network 304b, a production network 304c, and/or a VPN 304d), a plurality of routers 306a-b, a plurality of firewall devices 308a-b, a plurality of game servers 310a-g (e.g., web servers 310a, application servers 310b, messaging broker servers 310c, game broadcaster servers 310d, chat servers 310e, database servers 310f, and/or management and monitoring servers 310g), and/or an application delivery controller cluster 322.

According to some embodiments, any or all of the components 302a-b, 304a-b, 306a-b, 308a-b, 310a-g, 322 of the system 300 may be similar in configuration and/or functionality to any similarly named and/or numbered components described herein. Fewer or more components 302a-b, 304a-b, 306a-b, 308a-b, 310a-g, 322 (and/or portions thereof) and/or various configurations of the components 302a-b, 304a-b, 306a-b, 308a-b, 310a-g, 322 may be included in the system 300 without deviating from the scope of embodiments described herein. While multiple instances of some components 302a-b, 304a-b, 306a-b, 308a-b, 310a-g are depicted and while single instances of other components 322 are depicted, for example, any component 302a-b, 304a-b, 306a-b, 308a-b, 310a-g, 322 depicted in the system 300 may comprise a single device, a combination of devices and/or components 302a-b, 304a-b, 306a-b, 308a-b, 310a-g, 322, and/or a plurality of devices, as is or becomes desirable and/or practicable. Similarly, in some embodiments, one or more of the various components 302a-b, 304a-b, 306a-b, 308a-b, 310a-g, 322 may not be needed and/or desired in the system 300.

In some embodiments, a first user device 304a may comprise an electronic device owned and/or operated by a player of an online game (not explicitly shown) and/or by an entity that otherwise accesses online game content and/or services externally (e.g., requiring external login and/or access credentials and/or procedures). The first user device 304a may, for example, be utilized to access content provided by and/or via the application delivery controller cluster 322. In some embodiments, the first user device 304a may interface with and/or connect to the production network 304c via the primary service provider network 304a and/or the secondary service provider network 304b. The primary service provider network 304a and the secondary service provider network 304b may, for example, load balance and/or provide redundant coverage for outage recovery by utilization of a first primary service provider network router 306a-1, a second primary service provider network router 306a-2, a first secondary service provider network router 306b-1, and/or a second secondary service provider network router 306b-2.

According to some embodiments, the application delivery controller cluster 322 may be insulated and/or protected from the production network 304c by an external firewall cluster 308a. The first user device 304a may, for example, be required to provide credentials to and/or otherwise access the application delivery controller cluster 322 via the external firewall cluster 308a.

In some embodiments, the application delivery controller cluster 322 may receive via and/or from the external firewall cluster 308a and/or the production network 304c, one or more requests, calls, transmissions, and//or commands from the first user device 304a. The first user device 304a may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 304a and one or more of the servers 310a-g. In the case that the first user device 304a is utilized to access an online gaming interface for example, one or more of the web servers 310a (e.g., that may provide graphical and/or rendering elements for an interface and/or other web services) and/or the application servers 310b (e.g., that may provide rule and/or logic-based programming routines, elements, and/or functions—e.g., game play engines) may be called and/or managed by the application delivery controller cluster 322.

In some embodiments, the messaging broker servers 310c may receive and/or retrieve messages from the first user device 304a (and/or from one or more of the other servers 310a-b, 310d-g) and perform one or more inter-application processes in relation thereto. The messaging broker servers 310c may, for example, route, transform, consolidate, aggregate, store, augment, and/or otherwise process one or more requests in connection with provision of online gaming services to the first user device 304a (e.g., facilitating a decoupling of services provided by various applications on and/or from the various servers 310a-b, 310d-g). According to some embodiments, the game broadcaster servers 310d may provide scheduled releases of information descriptive of an online game. The game broadcaster servers 310d may, for example, provide a broadcast feed of bingo numbers, slot and/or other random (and/or pseudo-random) number results that may be accessed by (and/or transmitted to) the first user device 304a (e.g., in connection with the play of an online bingo, slots, and/or other game for which broadcast information may be utilized). In some embodiments, the chat servers 310e may provide, manage, and/or facilitate communications between the first user device 304a (and/or first user thereof) and one or more other player/user devices (such as a second user device 302b and/or other player/user devices not shown in FIG. 3).

According to some embodiments, the second user device 304b may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 304b to interface with the privately-accessible VPN 304d. The VPN 304d may, for example, provide direct access to the application servers 310b, the database servers 310f, the management and monitoring servers 310g, and/or the application delivery controller cluster 322. In some embodiments (as depicted in FIG. 3), such access may be gated through and/or insulated or protected by an internal firewall cluster 308b. The second user device 304b may, for example, be required to provide credentials to and/or otherwise access the application delivery controller cluster 322 and/or servers 310a-g via the internal firewall cluster 308b.

In some embodiments, the database servers 310f may provide access to one or more databases and/or data stores (e.g., not shown in FIG. 3; for data storage and/or retrieval). In some embodiments, the management and monitoring servers 310g may provide services such as monitoring, reporting, troubleshooting, analysis, configuring, etc. to the second user device 304b. The second user device 304b may, for example, access the management and monitoring servers 310g and/or the database servers 310f to run reports descriptive of online gaming operations, game play, and/or game referral setup, management, and/or analysis. According to some embodiments, either or both of the user devices 304a-b in conjunction with one or more of the servers 310a-g and/or the application delivery controller cluster 322 may conduct (in whole or in part), facilitate, and/or otherwise be associated with execution of one or more stored procedures, applications, processes, and/or methods (e.g., the methods described herein below, and/or a portion thereof).

Utilization of the term "server" with respect to the servers 310a-g of the system 300 of FIG. 3 is meant solely to ease description of the configuration and/or functionality of the servers 310a-g. The term "server" is not intended to be limiting with respect to any particular hardware, software, firmware, and/or quantities thereof utilized to implement any or all of the servers 310a-g of the system 300. Similarly, while multiple types and/or instances of the severs 310a-g are depicted in FIG. 3, any or all of the servers 310a-g may be implemented in, on, and/or by one or multiple computer server(s) and/or other electronic devices.

Methods

The above described systems and apparatus are adapted to perform the following methods of the present invention. In other words, for example, the user devices described above are adapted to be used by players to participate in online games implemented on the gaming systems also described above. It will be understood that the methods described below can be implemented in software (e.g., processor instructions adapted to be executed by the systems and apparatus described above) developed using any number of various computer languages and programing techniques such as object oriented programming. It will be further understood that any of the methods can alternatively or additionally be implemented in hardware and that any particular arrangement, order, grouping, and/or structure of hardware and software components, modules, functions, objects, and/or portions thereof described herein are merely illustrative of example embodiments and any practicable arrangement capable of performing the methods disclosed herein is intended to be covered by this specification. In accordance with some embodiments, methods are provided that are adapted to promote game play frequency.

Figure 4:
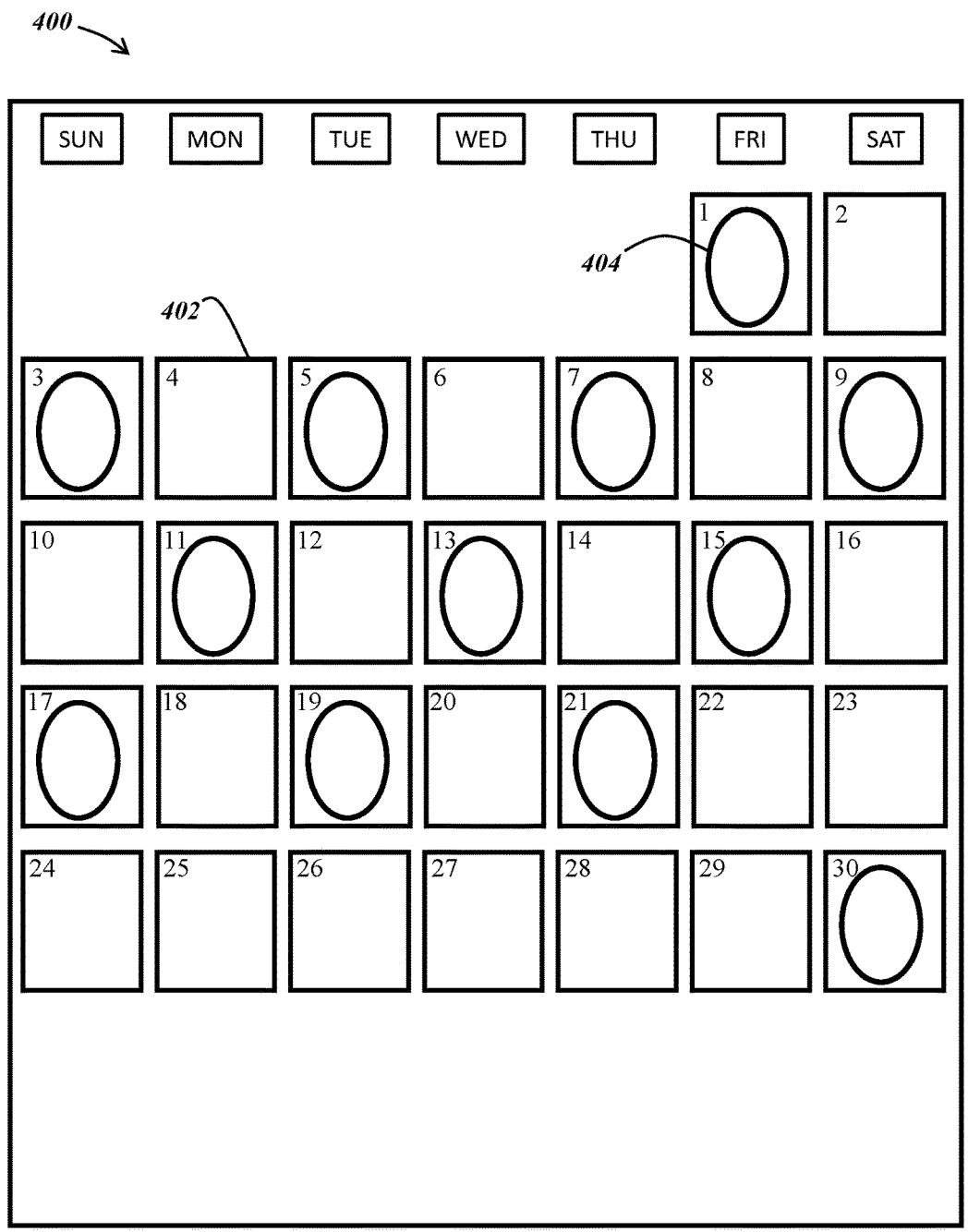
FIG. 4 is a block diagram depicting an example of a game interface layout during a first stage of game play according to one or more embodiments described herein.

Turning now to FIG. 4, an example game interface 400 is depicted as it might be presented on a display of a player device 102a, 102b, 102n as depicted in FIG. 1. The example game interface 400 can be used for a free-to-play game and includes a grid layout (e.g., a one month calendar) of positioned game elements (e.g., grid positions 402). In other embodiments, the positioned game elements can be arranged in a circular, oval, triangular, hexagonal, or any other pattern. Note that in the example embodiment, thirty grid positions 402 are depicted corresponding to days in a month. In other embodiments, more or fewer grid positions 402 can be displayed. In addition, the grid positions 402 can correspond to hours or weeks or any predefined game time period. Likewise, the number of grid positions 402 can correspond to days, weeks, years, or any game duration. The particular example interface 400 corresponds to a free-to-play game with a one day game time period, a once daily play frequency, and a duration of one month.

Within some of the grid positions 402, a game indicia 404 is depicted. The game indicia 404 can be a graphic or other symbol that represents a game piece or prize earned by or awarded to a player for simply accessing the game system or otherwise playing a game during a particular game time period. For example, a player can be presented with a primary free-to-play game upon accessing the game system during a particular game time period. If the player wins, the player can be awarded a game indicia 404 for use in a secondary free-to-play game. In some embodiments, the game indicia 404 can be awarded for playing a round or instance of a pay-to-play game during a particular game time period. In other embodiments, the game indicia 404 can be awarded as a prize for collecting certain symbols, for example, on a spinning reel or other game during a particular game time period.

Regardless of how the game indicia 404 is acquired by the player, in some embodiments, the system places the game indicia 404 on a grid position 402 that corresponds to the game time period in which the player acquired the game indicia 404. The example grid positions 402 in FIG. 4 are sized for a single game indicia 404, however, in other embodiments, the grid positions 402 can be sized to allow as many game indicia 404 as the player has acquired for the game time period corresponding to the grid position 402. As time passes during the game duration (e.g., a month), the player can continue to add additional game indicia 404 to the grid positions 402. As shown in FIG. 4, a player has acquired game indicia on the $1^{st}$, $3^{rd}$, $5^{th}$, $7^{th}$, $9^{th}$, $11^{th}$, $13^{th}$, $15^{th}$, $17^{th}$, $19^{th}$, $21^{st}$ and $30^{th}$ days of the month long (i.e., 30 day) game duration.

Figure 5:
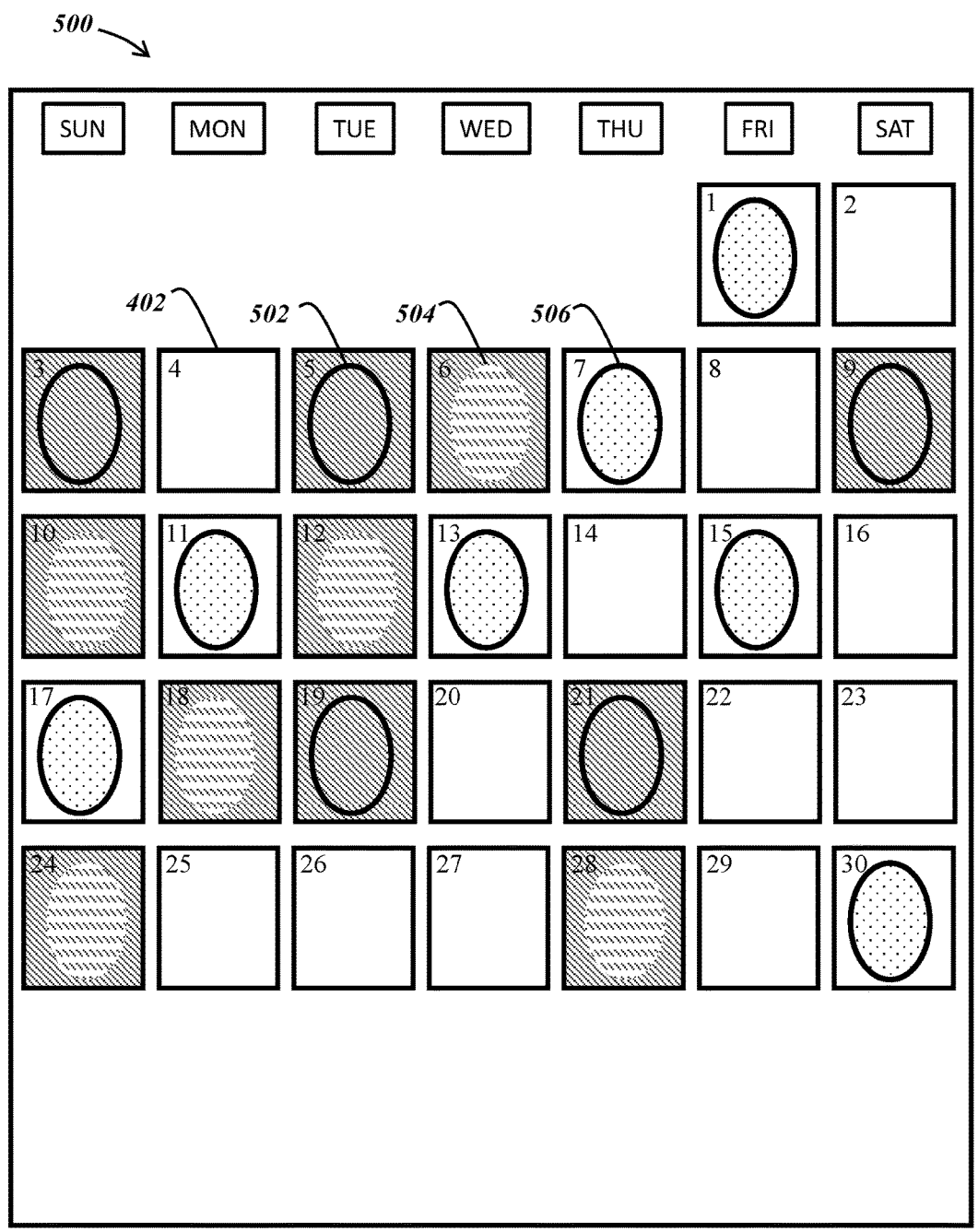
FIG. 5 is a block diagram depicting an example of a game interface layout during a second stage of game play according to one or more embodiments described herein.

In some embodiments, once the game duration has ended, the system reveals the "lucky days" or a selected set of positioned game elements (e.g., grid positions 402) corresponding to particular game time periods. FIG. 5 depicts an example game interface 500 wherein the system has revealed the selected grid positions 502, 504 indicated by a diagonal hatching pattern background. Selected grid positions that included a game indicia 502 are depicted by an oval filed with a diagonal hatching pattern. Selected grid positions that did not include a game indicia 504 are depicted by an oval filed with a dashed hatching pattern. Unselected grid positions that included a game indicia 506 are depicted by an oval filed with a stippling pattern. The selection of positioned game elements and/or the number selected can be random or based upon a deterministic formula selected to insure a sufficient incentive to play is awarded to players. Thus, the $3^{rd}$, $5^{th}$, $6^{th}$, $9^{th}$, $10^{th}$, $12^{th}$, $18^{th}$, $19^{th}$, $21^{st}$, $24^{th}$, and $28^{th}$ days were the selected "lucky days" and of those days, on the $3^{rd}$, $5^{th}$, $9^{th}$, $19^{th}$ and $21^{st}$ the player had acquired game indicia 404. Because the player did not have game indicia 404 for the $6^{th}$, $10^{th}$, $12^{th}$, $18^{th}$, $24^{th}$, and $28^{th}$, the player missed out on an opportunity to win prizes on those selected "lucky days." Note that the interface 500 provides a clear indication of all the selected days for which the player did not acquire a game indicia 404. Thus, the interface 500 provides further incentive to the player to play more frequently to gain better "coverage" of the positioned game elements (e.g., grid positions 402).

Figure 6:
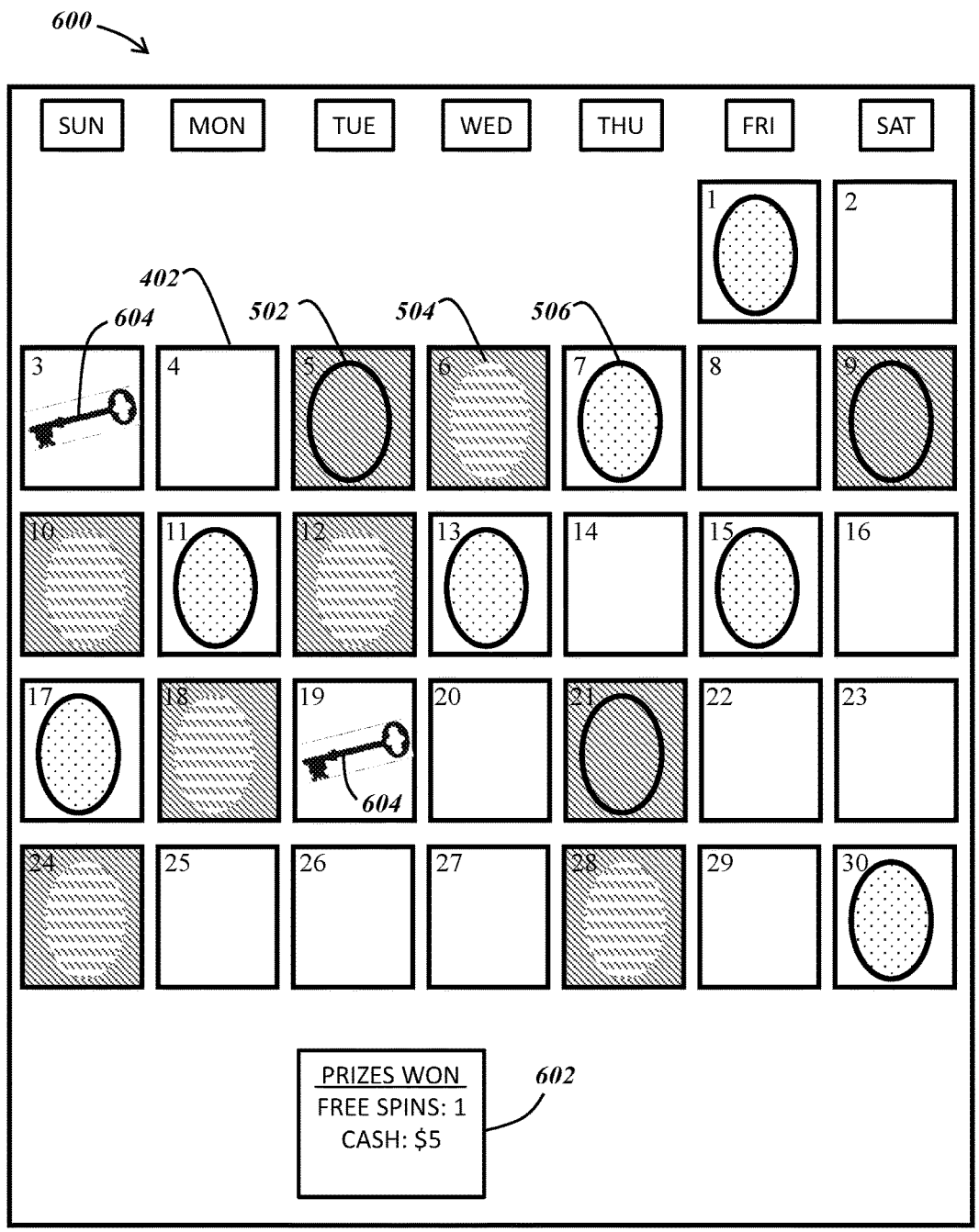
FIG. 6 is a block diagram depicting an example of a game interface layout during a third stage of game play according to one or more embodiments described herein.

In some embodiments, the system next reveals which, if any of the selected grid positions that included a game indicia 502 have prizes for the player. In some embodiments, the prizes are automatically revealed to the player all at once or one at a time. In other embodiments as shown in FIG. 6, an interface 600 is provided that allows the player to "unlock" or expose the prizes he has won by providing a graphical user interface (GUI) control that allows the user to select and open or uncover each of the selected grid positions that included a game indicia 502. For example, by clicking on the selected grid positions that included a game indicia 502, the player causes the interface 600 to indicate the prize, if any, the player has won in a "Prizes Won" display field 602 and changes the graphic representing the selected grid position that included a game indicia 502 into an "unlocked" graphic symbol (e.g., a key image 604). Once the player reveals all of the prizes, the system can present the player with an opportunity to use the prizes, for example in the case of "free spin" prizes, or offers the player a payout in the case of a cash or game credit prize. Note that in some embodiments, players can be required to establish and/or fund an account with the system before they are permitted to use or receive their prizes.

Figure 7:
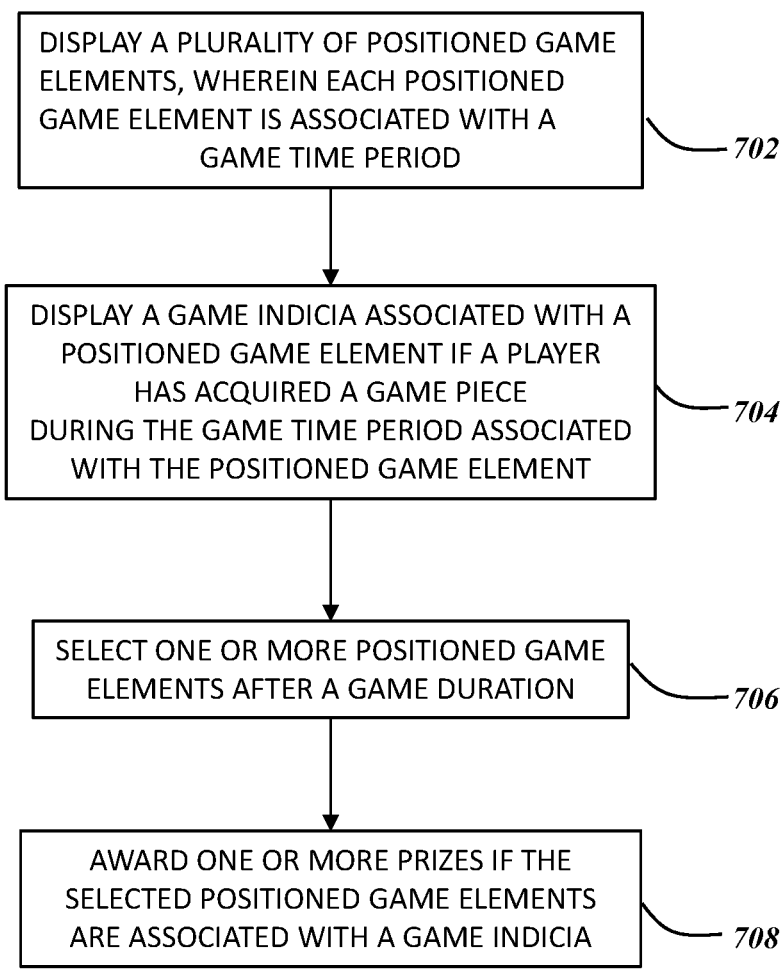
FIG. 7 is a flowchart illustrating an example method of promoting game play frequency according to one or more embodiments described herein.

Turning now to FIG. 7, a flow chart depicting an example method of embodiments of the present invention is provided. In some embodiments, a plurality of positioned game elements is displayed in a game interface (702). For example, the game elements can include grid positions. Each positioned game element can be associated with a game time period. For example, where the positioned game elements are grid positions, each grid position can represent a day of a calendar. Next, a game indicia associated with a positioned game element is displayed if a player has acquired a game piece during the game time period associated with the positioned game element (704). The system awards game pieces to players for each game time period (e.g., each day) if they access or play the game during the particular game time period. A game indicia representing the game piece is displayed on the positioned game elements (e.g., the grid position or calendar day) that correspond to each game time period. Next, the system selects one or more positioned game elements (e.g., calendar days) after a game duration (e.g., a month) (706). The selected positioned game elements are "lucky days" that will potentially be eligible for prize awards. One or more prizes are awarded to the player by the system if the selected positioned game elements (e.g., the lucky days) are associated with a game indicia (e.g., the player acquired a game indicia on that day by accessing or playing the game) (708).

As discussed in this disclosure, awarding a prize may comprise awarding one or more multipliers, extra wins and/or other types of benefits, based on one or more of: whether the player acquired a game piece for any special game time periods and/or whether the player acquired a game piece for each of a minimum number of consecutive game time period (e.g., seven plays of a daily game in a row).

It should be noted that while various particular examples have been provided herein, the inventive concepts should not be limited to such examples. Other variations of the above-described embodiments would be readily appreciated by one of ordinary skill in the art upon reading the present disclosure. For example, Rules of Interpretation Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™ Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention claimed is:

1. An online gaming system for managing game play frequency for a plurality of networked player devices, the online gaming system comprising:
   a processor; and
   a memory storing instructions, the instructions adapted to execute on the processor to:
   receive a call from a player device for an online gaming interface for an online game;
   transmit a call to a game application server of a game server cluster to access programming routines of a game play engine;
   receive a plurality of positioned game elements for the online gaming interface;
   display, at a player device using the online gaming interface, the plurality of positioned game elements for an online secondary game, wherein each positioned game element is associated with a game time period;
   display, at the player device using the online gaming interface and based on the game play engine, a game indicia associated with a positioned game element for the online secondary game if a game piece is acquired during the game time period associated with the positioned game element;
   receive a broadcast feed of selected positioned game elements for the online secondary game;
   select, using the online gaming interface, one or more positioned game elements, after a game duration, based on the broadcast feed; and award, using the online gaming interface, one or more prizes for the online secondary game for the selected positioned game elements that are associated with a game indicia.

2. The online gaming system of claim 1 wherein the positioned game elements are grid positions.

3. The online gaming system of claim 1 wherein the grid positions correspond to a calendar.

4. The online gaming system of claim 1 wherein the game time period is at least one of an hour, a day, a week, and a month.

5. The online gaming system of claim 1 wherein a game piece can be acquired by accessing or playing an online primary game.

6. The online gaming system of claim 1 wherein the instructions are further adapted to display the selected positioned game elements that include associated game indicia and to display the selected positioned game elements that do not include associated game indicia.

7. The online gaming system of claim 1 wherein the instructions are further adapted to allow a player, using the online gaming interface, to reveal the prizes for the selected positioned game elements that are associated with game indicia.

8. An online gaming system comprising:
a game server cluster comprising a plurality of game application servers configured to provide programming routines of a game play engine;
a web server configured to provide graphical elements of an online gaming interface; and
an application delivery controller in communication with a plurality of player devices, the game server cluster, and the web server, the application delivery controller comprising:
a processor; and
a memory storing instructions, the instructions adapted to execute on the processor to:
receive, from the web server, a plurality of positioned game elements for the online gaming interface;
display, at a player device using the online gaming interface, a plurality of positioned game elements for an online secondary game, wherein each positioned game element is associated with a game time period;
display, at the player device using the online gaming interface and based on the game play engine, a game indicia associated with a positioned game element for the online secondary game if a game piece is acquired during the game time period associated with the positioned game element;
select, using the online gaming interface, one or more positioned game elements, after a game duration; and
award, using the online gaming interface, one or more prizes for the online secondary game for the selected positioned game elements that are associated with a game indicia.

9. The online gaming system of claim 8 wherein the positioned game elements are grid positions.

10. The online gaming system of claim 8 wherein the grid positions correspond to a calendar.

11. The online gaming system of claim 8 wherein the game time period is at least one of an hour, a day, a week, and a month.

12. The online gaming system of claim 8 wherein a game piece can be acquired by accessing or playing an online primary game.

13. The online gaming system of claim 8 wherein the instructions are further adapted to display the selected positioned game elements that include associated game indicia and to display the selected positioned game elements that do not include associated game indicia.

14. The online gaming system of claim 8 wherein the instructions are further adapted to allow a player, using the online gaming interface, to reveal the prizes for the selected positioned game elements that are associated with game indicia.

15. An online gaming system comprising:
a game server cluster comprising a plurality of game application servers configured to provide programming routines of a game play engine; and
an application delivery controller in communication with a plurality of player devices and with the game server cluster, the application delivery controller comprising:
a processor; and
a memory storing instructions, the instructions adapted to execute on the processor to:
transmit a call to a game application server of the game server cluster to access programming routines of the game play engine;
receive a plurality of positioned game elements for an online gaming interface;
display, using the online gaming interface, the plurality of positioned game elements for an online secondary game, wherein each positioned game element is associated with a game time period;
display, using the online gaming interface and based on the game play engine, a game indicia associated with a positioned game element for the online secondary game if a game piece is acquired during the game time period associated with the positioned game element;
receive selected positioned game elements for the online secondary game;
select one or more positioned game elements; and
award, using the online gaming interface, one or more prizes for the online secondary game for the selected positioned game elements that are associated with a game indicia.

16. The online gaming system of claim 15 wherein the positioned game elements are grid positions.

17. The online gaming system of claim 15 wherein the grid positions correspond to a calendar.

18. The online gaming system of claim 15 wherein the game time period is at least one of an hour, a day, a week, and a month.

19. The online gaming system of claim 15 wherein a game piece can be acquired by accessing or playing an online primary game.

20. The online gaming system of claim 15 wherein the instructions are further adapted to display the selected positioned game elements that include associated game indicia and to display the selected positioned game elements that do not include associated game indicia.

21. The online gaming system of claim 15 wherein the instructions are further adapted to allow a player, using the online gaming interface, to reveal the prizes for the selected positioned game elements that are associated with game indicia.

* * * * *